US012807001B2

(12) United States Patent
Guzik

(10) Patent No.: US 12,807,001 B2
(45) Date of Patent: Nov. 24, 2026

(54) MEANS OF TRANSPORT, DRIVER ASSISTANCE SYSTEM AND METHOD FOR HANDLING A BREAKDOWN SITUATION

(71) Applicant: Bayerische Motoren Werke Aktiengesellschaft, Munich (DE)

(72) Inventor: Marcin Guzik, Friedberg (DE)

(73) Assignee: Bayerische Motoren Werke Aktiengesellschaft, Munich (DE)

( * ) Notice: Subject to any disclaimer, the term of this patent is extended or adjusted under 35 U.S.C. 154(b) by 0 days.

(21) Appl. No.: 18/881,839

(22) PCT Filed: May 30, 2023

(86) PCT No.: PCT/EP2023/064352
§ 371 (c)(1),
(2) Date: Jan. 7, 2025

(87) PCT Pub. No.: WO2024/022646
PCT Pub. Date: Feb. 1, 2024

(65) Prior Publication Data

US 2025/0229633 A1 Jul. 17, 2025

(30) Foreign Application Priority Data

Jul. 25, 2022 (DE) ..................... 10 2022 118 480.3

(51) Int. Cl.
*B60L 3/00* (2019.01)
*B60L 3/12* (2006.01)
*B60L 58/20* (2019.01)

(52) U.S. Cl.
CPC ............... *B60L 3/0023* (2013.01); *B60L 3/12* (2013.01); *B60L 58/20* (2019.02)

(58) Field of Classification Search
CPC ........... B60L 3/0023; B60L 58/20; B60L 3/12
See application file for complete search history.

(56) References Cited

U.S. PATENT DOCUMENTS 11,639,146 B2 * 5/2023 Chu ...................... B60R 21/017 701/45
2011/0320080 A1 12/2011 Lehner et al.
(Continued)

FOREIGN PATENT DOCUMENTS

CN 112060911 B 6/2022
CN 114670635 A 6/2022
(Continued)

OTHER PUBLICATIONS

International Search Report (PCT/ISA/210) issued in PCT Application No. PCT/EP2023/064352 dated Aug. 22, 2023 with English translation (7 pages).
(Continued)

*Primary Examiner* — Naeem Taslim Alam
(74) *Attorney, Agent, or Firm* — Crowell & Moring LLP

(57) ABSTRACT

A vehicle, a driver assistance system and a method for handling a breakdown situation of the vehicle are provided. The driver assistance system includes a high-voltage (HV) on-board electrical system and a low-voltage (LV) on-board electrical system. The method includes automatically detecting a breakdown of the vehicle, automatically determining that there is no energy conversion from the HV on-board electrical system into the LV on-board electrical system, automatically determining a charging status of an energy store of the LV on-board electrical system, automatically determining a criticality of a vehicle situation, and, according to the above-mentioned information, automatically deciding whether, and if so which, measures are to be taken or proposed for the protection of the vehicle and/or occupants of the vehicle.

17 Claims, 3 Drawing Sheets

(56) References Cited

U.S. PATENT DOCUMENTS

| | | | | |
|---|---|---|---|---|
| 2012/0123622 | A1 | 5/2012 | Miyazaki | |
| 2012/0303192 | A1* | 11/2012 | Kim | B60L 3/003<br>903/903 |
| 2017/0032585 | A1* | 2/2017 | Stenneth | G07C 5/008 |
| 2017/0166079 | A1* | 6/2017 | Saucke | B60L 58/15 |
| 2018/0178654 | A1* | 6/2018 | Nishimura | B60L 50/15 |
| 2018/0201187 | A1* | 7/2018 | Yellambalase | B60L 50/51 |
| 2020/0010070 | A1* | 1/2020 | Umeda | B60T 17/22 |
| 2021/0311124 | A1* | 10/2021 | Takahashi | B60L 1/00 |
| 2022/0021071 | A1* | 1/2022 | Shimizu | B60L 58/26 |
| 2023/0179011 | A1* | 6/2023 | Liang | B60L 1/00<br>323/284 |
| 2023/0266399 | A1* | 8/2023 | Ishii | G01R 31/392<br>702/63 |
| 2024/0364181 | A1* | 10/2024 | Gohs | H02K 15/33 |

FOREIGN PATENT DOCUMENTS

| | | | |
|---|---|---|---|
| DE | 10 2010 046 616 | A1 | 3/2012 |
| DE | 10 2015 223 612 | A1 | 6/2017 |
| DE | 10 2018 222 867 | A1 | 6/2020 |
| DE | 10 2021 103 730 | A1 | 8/2022 |
| EP | 2 385 908 | B1 | 10/2014 |
| WO | WO 2022/043622 | A1 | 3/2022 |

OTHER PUBLICATIONS

German-language Written Opinion (PCT/ISA/237) issued in PCT Application No. PCT/EP2023/064352 dated Aug. 22, 2023 with English translation (9 pages).

German-language Search Report issued in German Application No. 10 2022 118 480.3 dated Feb. 10, 2023 with partial English translation (10 pages).

* cited by examiner

MEANS OF TRANSPORT, DRIVER ASSISTANCE SYSTEM AND METHOD FOR HANDLING A BREAKDOWN SITUATION

BACKGROUND AND SUMMARY

The present invention relates to a means of transport, a driver assistance system, and a method for handling a breakdown situation of an electrically drivable means of transport. In particular, the present invention relates to measures for switching off consumers in the breakdown situation to be able to use the reduced energetic resources of a low-voltage onboard network in a hybrid vehicle in the best possible manner for protection in the breakdown situation.

The electrification of personal individual traffic is presently progressing rapidly. In this case, in addition to a high-voltage onboard network (voltages above 60 V or 80 V DC voltage) a low-voltage onboard network of typically 12 V or 24 V is typically maintained. The respective energy storage devices (accumulators, batteries) provide energy for use in the respective onboard network and support/buffer the respective onboard network. With increasing electrification and the displacement of the electrical energy contents to the high-voltage onboard network side, storage devices having smaller capacity are installed for the low-voltage onboard network areas. This takes place in particular for reasons of weight and efficiency, since, for example, it is no longer necessary to start an internal combustion engine (internal combustion engine not present) or the powers of the internal combustion engine are lower and require a lower energy consumption for starting or the high-voltage onboard network side is used to start the internal combustion engine. In the event of a vehicle breakdown having intact high-voltage or 48 V onboard network system, sufficient energy is available for the vehicle protection (above all by means of warning and exterior lights) due to the possibility of converting energy from the high-voltage onboard network into the low-voltage onboard network. The behavior is different if only the 12 V storage device still carries the load and has to ensure the warning and exterior lighting alone. In this case, the availability for the protection of the vehicle in the breakdown situation sinks significantly. In particular, no suitable measures are undertaken by means of transport known in the prior art to ensure the sufficiently long availability of the warning and exterior lights.

The above-mentioned object is achieved according to the invention by a method for handling a breakdown situation of an electrically drivable means of transport having an HV onboard network and a low-voltage onboard network. The term “breakdown” is understood in the context of the present disclosure as a vehicle status in which a function essential for propulsion is not provided and the energy transfer between the high-voltage onboard network and a low-voltage onboard network is suppressed because of a technical defect or an energetic nonavailability. In other words, the means of transport cannot or should not be moved in the breakdown situation. The reasons for the “breakdown” can include other electrical problems, such as an empty traction battery, a defective converter, a defective line to the low-voltage onboard network or the like, as well as conventional fault situations (flat tire, motor damage, or the like).

The breakdown is automatically determined according to the invention in a first step. This can be carried out by suitable sensors of the means of transport. The breakdown differs from an “accident” in the meaning of the present invention, however, at least in that no airbag or emergency call is automatically triggered by the fault situation itself. In other words, an external action (if present at all) is sufficiently minor that (initially) no immediate health hazard is provided for the occupants of the ego means of transport.

In a second step, it is detected that an energy conversion from the high-voltage onboard network into the low-voltage onboard network does not take place. In other words, it can be automatically established that the low-voltage onboard network cannot be supported by the energetic resources available in the high-voltage onboard network. This can have the background that no high-voltage energy resources are available or that a conversion of the high-voltage energy or a transfer thereof into the low-voltage onboard network cannot take place. In other words, due to the low capacity of the energy storage device of the low-voltage onboard network, a long-term (optical) protection of the means of transport is endangered. In a third step, a state of charge of an energy storage device of the low-voltage onboard network is then automatically determined. For example, it can be determined that a predefined good state of charge of the energy storage device prevails and a comparatively long protection of the means of transport is ensured. In a further step, it is automatically determined that a specific criticality exists for the vehicle situation. The criticality can also be understood as the hazard state of the means of transport or due to the means of transport or its occupants. For example, on a shoulder of a freeway, a greater hazard potential is provided than on a parking area or in the home garage. A criminality rate automatically determined for the vehicle location can also be automatically determined and used to determine the criticality of the vehicle situation. Alternatively or additionally, weather conditions (strong heat, incident sunshine, storm, or the like) can also contribute to the criticality or cause a criticality level. In dependence on all above-mentioned information, it is then automatically decided according to the invention whether and if yes which measures are to be automatically taken or automatically proposed for the means of transport and/or occupant protection. Taking the measures can also be understood as initiating the measures. In contrast, proposing the measures causes a notification to a user (for example, to the driver) of the means of transport, in response to which the user can independently cause the initiation of the measures. In particular, he can be notified thereof by a prompt on a display screen and can initiate the proposed measures upon accepting the prompt by means of a predefined switching surface. Therefore, in spite of reduced energetic availability, a situation-suitable protection of the means of transport can take place.

The dependent claims disclose preferred refinements of the invention. The criticality can take into consideration different parameters of the vehicle situation. In addition to the ego system values, the means of transport can also execute external conditions, such as traffic volume, time of day and season, light and visibility conditions, and a zone hazard (criminality, risk of earthquake, risk of falling rock, or the like) via satellite-based locating (geo-positioning). In particular, digital map material can be used to estimate the location of the position of the breakdown and assess it with respect to its criticality. However, a criticality can also take into consideration the states within the passenger compartment. For example, old, frail, or particularly young passengers can be located in the interior of the means of transport and cause an increase of the criticality level. In particular, for the case that external or inherent circumstances can be interpreted as an occupant hazard, the criticality can be increased due to the detected occupants. The occupants can be determined, for example, via cameras, pressure sensor mats for seat occupancy detection, interior temperatures, or the like. Vitality sensors and (contactless) temperature sensors for body temperature detection sometimes already proposed in the prior art can be used to draw further conclusions about an acute hazard to the occupants.

The high-voltage onboard network can have a voltage of at least 60 V, preferably at least 400 V or even 800 V, while the low-voltage onboard network has a voltage of 6 V to 20 V, but at most 48 V. The above-mentioned voltages relate in particular to a DC voltage onboard network or respective DC voltage onboard networks.

The means of transport can have a traction machine which can no longer be operated or should no longer be operated in the breakdown situation. In particular, the traction machine is also no longer capable of supporting the low-voltage onboard network by converting fossil fuels. In the manner according to the invention, measures are therefore initiated or proposed to adapt the protection of the means of transport or the occupants in graduated form and in dependence on a respective availability level of electrical or electrochemical resources.

The low-voltage onboard network can be fed by means of the energy storage device, wherein the electrochemical energy storage device has a capacity of not greater than 50 amp hours, preferably smaller capacities beginning from 10 amp hours.

The criticality of the vehicle situation can be determined by means of a sensor for satellite-based locating in conjunction with a digital roadmap. Road areas or road categories can be used in this case which stand in the digital map material for the speed, the width, and the evasion possibilities of the flowing traffic and can therefore be used for conclusions about the criticality for the geographical vehicle situation.

If the energy stored in the low-voltage onboard network dwindles further, a reduction of a state of charge and/or an increase of the criticality of the means of transport situation can be determined automatically (in particular sensorially) and in response thereto it can be decided that other measures for vehicle and/or occupant protection are to be taken automatically or proposed to a user. For example, to preserve the energetic reserves, it can be decided that interior lights, interior climate control, entertainment functions, or even (individual) exterior lighting devices are to be turned off. The signal effect of the protection measures is thus less, but the maximum duration of exterior lights (although they are reduced) can be extended.

It can also be determined that help is approaching. This can be communicated automatically to the means of transport, for example. For example, an informed breakdown service can send a message to the means of transport (for example, the telemetry unit), in response to which an expected arrival time can be determined. In dependence on the expected arrival time, it can in turn be determined that the criticality of the vehicle situation will no longer prevail for a long time and therefore an increased energetic expenditure for the best possible protection or occupant protection measures or occupant entertainment measures are maintained, which would have to be switched off for reasons of caution if the arrival time of the breakdown aid were unknown.

A few examples of measures by which the energetic resources of the low-voltage onboard network can be preserved in the breakdown situation are given hereinafter. For example, a message can be output to a user of the means of transport, in response to which the user can independently initiate measures to preserve the energetic resources. Moreover, automatically switching off a first group of electrical consumers can be proposed or executed automatically. Alternatively or additionally, further groups of electrical consumers can also be proposed for switching off or automatically switched off. For example, an emergency call (which has not yet been placed up to this point) can also be proposed or automatically established, to communicate the criticality (which has possibly increased in the meantime) or the reduced energy level to the emergency services. Alternatively or additionally, a predefined area of exterior lights of the means of transport can be automatically switched off or proposed for switching off.

As soon as the strategy for the operation of the onboard network according to the invention thus changes in an emergency mode, the energy consumption can be reduced in a graduated manner in dependence on the state of charge (SOC). For this purpose, individual consumers or groups of consumers can be disconnected from the energy supply staggered over time in predefined consumer groups. A communication to the user can take place in each case about which consumers are no longer available from this point on and for which reason. It can be communicated how long the protection measures for the means of transport can still be maintained or can be extended by the respective switching off. This increases the acceptance of the user for the initiated measures.

Upon reaching a predefined state of charge threshold, a prioritized emergency call or "breakdown call" can be placed to a service provider. An increased criticality is communicated by this call and the processing for the ego means of transport can be prioritized.

Upon reaching a predefined criticality level, a further service provider (emergency services or the like) can also automatically be called or proposed to the user for making contact.

According to a second aspect of the present invention, a driver assistance system is proposed, by which the above-mentioned method steps can be carried out. The driver assistance system comprises a data input and an evaluation unit, by which the driver assistance system is configured to automatically determine a breakdown of the means of transport by means of the data input. In other words, it is established in the onboard network of the means of transport that the means of transport cannot or should not continue to move forward. Moreover, it is automatically determined by means of the data input that an energy conversion of energy stored in the high voltage onboard network into the low-voltage onboard network no longer takes place (for example, because this is no longer possible or this no longer takes place for other reasons). Moreover, the driver assistance system is configured to automatically determine a state of charge of an energy storage device of the low-voltage onboard network and a criticality of a vehicle situation (for example, in dependence on a geographical position of the means of transport) by means of the data input and to decide automatically in dependence on the above-mentioned information whether and if yes which measures for protecting the means of transport and/or occupants are to be taken (possibly automatically) or are to be proposed (automatically) to a user. In this way, the driver assistance system according to the invention is configured to implement features, combinations of features, and the advantages resulting therefrom of the method according to the invention in a corresponding manner sufficiently obviously that reference is made to the above statements to avoid repetition.

According to a third aspect of the present invention, a means of transport is proposed, which can be designed as a passenger vehicle, van, truck, motorcycle, aircraft, and/or water vehicle. The means of transport has a driver assistance system according to the second-mentioned aspect of the invention, so that the same features, combinations of features, and advantages also result for the means of transport.

Further details, advantages, and features of the present invention result from the following description of exemplary embodiments based on the drawings.

DETAILED DESCRIPTION OF THE DRAWINGS

Figure 1:
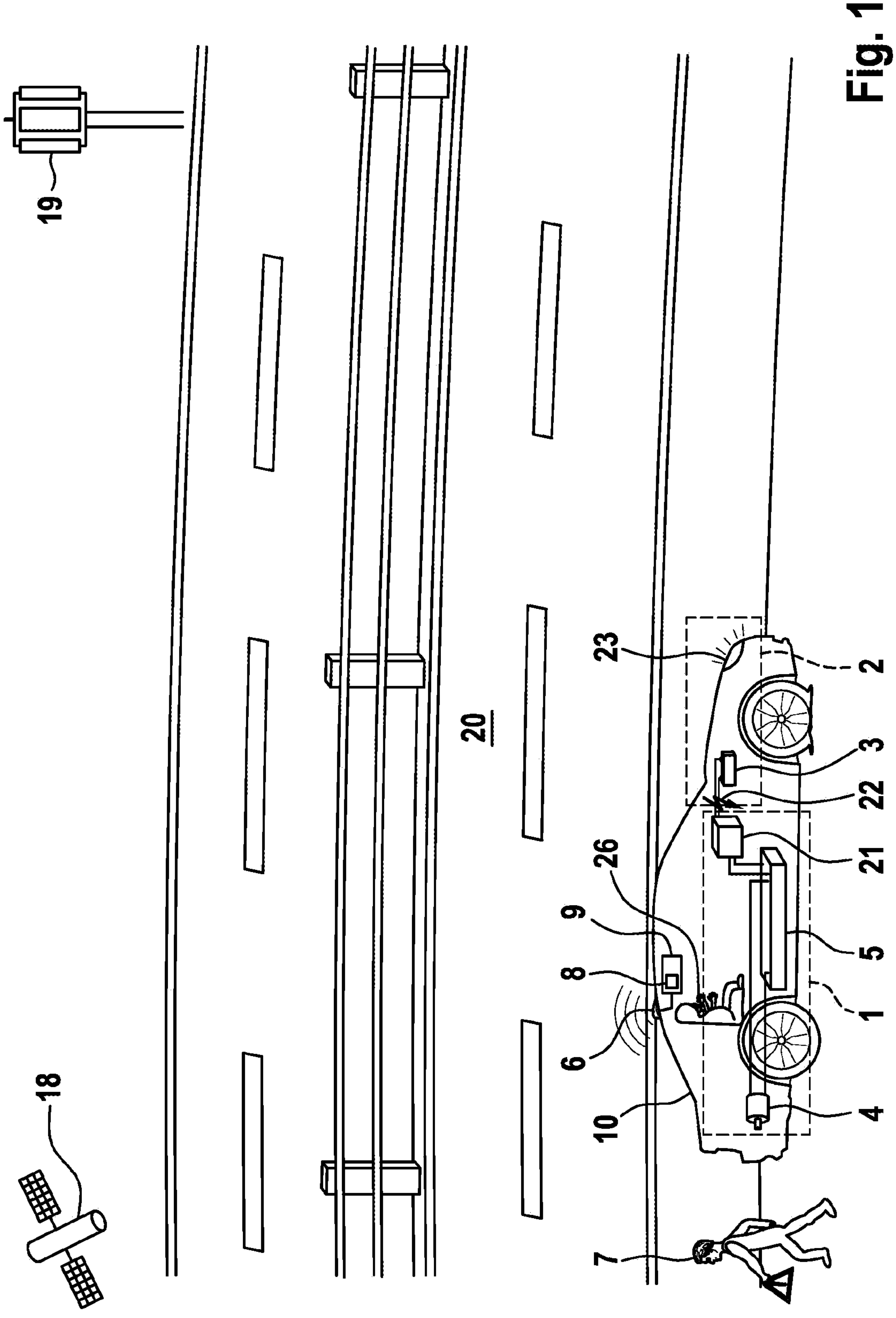
FIG. 1 shows a breakdown situation of a means of transport designed according to the invention having an exemplary embodiment of a driver assistance system designed according to the invention.

FIG. 1 shows a situation of a passenger vehicle in the form of an electrically drivable means of transport 10 on the shoulder of a freeway 20. The means of transport 10 has a flat tire, because of which a user 7 carries a warning triangle upstream or counter to the direction of travel to protect the breakdown location. A high-voltage energy storage device 5, which usually supplies a traction machine 4 with electrical energy, is in principle still ready for use. A DC/DC converter 21 is also in principle still available to convert the electrical energy present in the high voltage onboard network 1 to a voltage level of a low-voltage onboard network 2. However, a line interruption 22 has ensured that the energy stored in the energy storage device 3 of the low-voltage onboard network 2 is no longer available for a sufficiently long time for the operation of the exterior lights 23. A child 26 remaining in the means of transport 10 therefore cannot enjoy a climate control of the interior of the means of transport 10 for much longer. Therefore, an antenna 6 is caused as a sensor by the data output 8 of an electronic control unit 9 to inform a transmission mast 19 that the means of transport 10 urgently requires aid by a breakdown service at the current position (determined by means of a geostationary satellite 18). A closest location of an automobile club can be informed about the status and the criticality of the situation of the means of transport 10 via the transmission mast 19, for example, conveyed by Internet and aid can thus arrive in a timely manner before further comfort devices of the means of transport 10 decrease the protection of its occupants.

Figure 2:
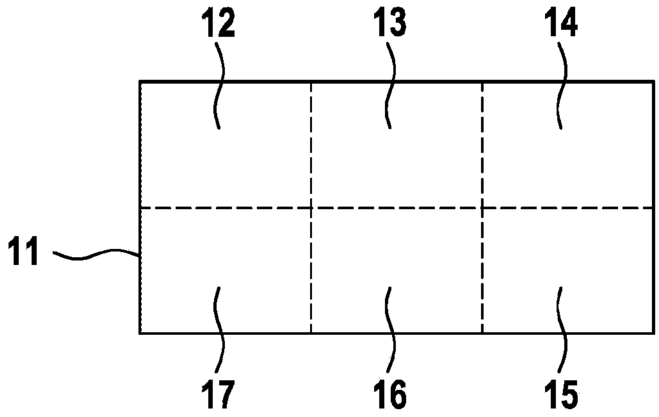
FIG. 2 shows a schematic representation of consumer groups which can be switched off automatically separately and in particular staggered over time according to one exemplary embodiment of the present invention.

FIG. 2 shows a schematic representation of electrical low-voltage consumers 11, which are divided into groups 12, 13, 14, 15, 16, 17. The groups 12 to 17 are assigned to different priority classes and can be prioritized differently in dependence on a current situation of exterior temperature, ambient light intensity, or the means of transport. For example, in cool exterior temperatures, a climate control of the means of transport can be completely unimportant, while a heating function is very significant for the safety of the occupants of the means of transport. On the other hand, in daylight exterior lights can be significantly less relevant for protecting a means of transport than at night. Therefore, a sequence of switching off the groups 12 to 17 can be varied due to the circumstances in dependence on the above-mentioned circumstances.

Figure 3:
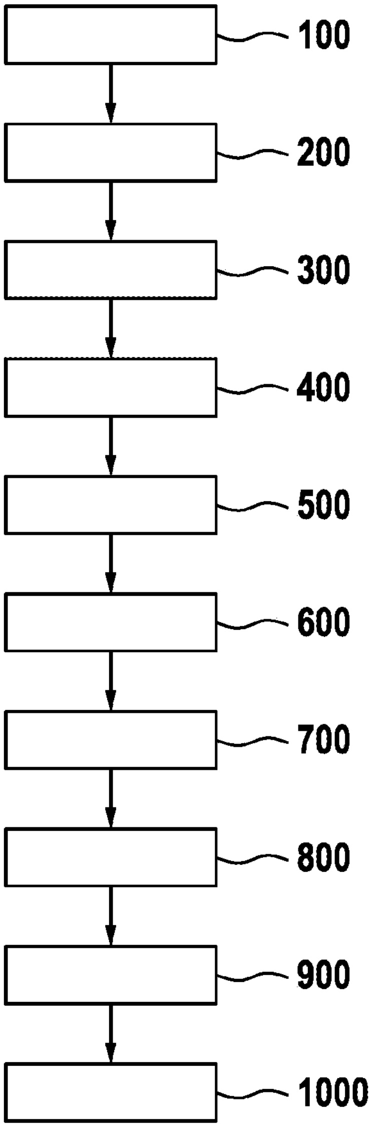
FIG. 3 shows a flow chart illustrating steps of an exemplary embodiment of a method according to the invention for handling a breakdown situation of a means of transport.

FIG. 3 shows steps of an exemplary embodiment of a method according to the invention for handling a breakdown situation of a means of transport. In step 100, a breakdown of the means of transport is automatically determined. For this purpose, an electronic control unit of the means of transport can question or deny the driving readiness thereof. In step 200, it is then automatically determined that an energy conversion of energy stored in the HV onboard network into low-voltage energy cannot take place. For example, an energy converter (such as a DC/DC converter) can be defective. In step 300, a state of charge of an energy storage device of the low-voltage onboard network is automatically determined. This can comprise, for example, a measurement of a voltage of the energy storage device. In step 400, a criticality of a vehicle situation is then automatically determined and it is automatically decided in dependence on all above-mentioned information in step 500 whether and if yes which measures are to be taken or automatically proposed to a user for protection of the means of transport and/or occupants. In other words, it is decided which electrical consumers are to be switched off or used further in consideration of a current breakdown situation for protection of the means of transport or its occupants. A message is therefore output in step 600 to a user of the means of transport that in step 700 a first group of electrical consumers will be switched off, in step 800 (after passage of a predefined duration) a further group of electrical consumers will also be switched off, in step 900 an emergency call placement will be automatically initiated, and in step 1000 a predefined area of exterior lights of the means of transport will finally be switched off. This can be those areas of the exterior lights which face away from the closest approaching traffic. For example, it can be determined by means of a reversing camera and/or front camera from which direction the vehicles driving past closest to the stationary ego means of transport, and only the areas of the exterior lights facing toward these vehicles can continue to be operated continuously, while all other electrical consumers are switched off.

Figure 4:
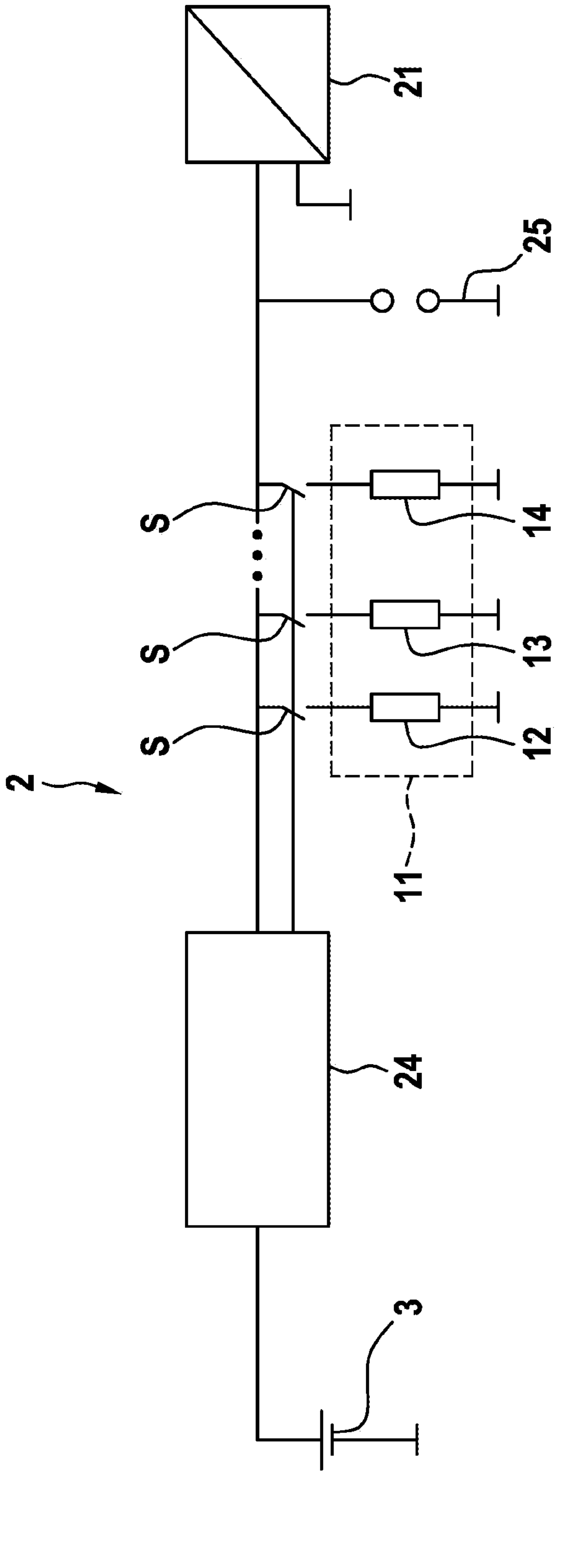
FIG. 4 shows a schematic representation of a low-voltage onboard network having a plurality of consumers that can be switched off separately.

FIG. 4 shows an exemplary schematic diagram of a low-voltage onboard network 2 in an exemplary embodiment according to the invention of a means of transport. A low-voltage battery 3 supplies a battery management control unit 24, which supplies a busbar with 12 V DC voltage. Electrical consumers 11, which are organized into groups 12, 13, 14, are connected to the busbar. Moreover, an external start support point 25 and the low-voltage-side input of a voltage converter 21 are connected to the busbar. Via switches, the battery management control unit 24 can switch off the electrical consumers 12, 13, 14 separately and as needed to preserve the energetic resources of the low-voltage battery 3.

LIST OF REFERENCE SIGNS

1 high-voltage onboard network
2 low-voltage onboard network
3 electrical energy storage device
4 traction machine
5 traction energy storage device

6 antenna
7 user
8 data output
9 electronic control unit
10 means of transport
11 electrical consumer
12 to 17 groups of electrical consumers
18 satellite
19 transmission mast
20 freeway
21 energy converter
22 line interruption
23 exterior lights
24 battery management control unit
25 external start support point
26 small child
100 to 1000 method steps
S switch

The invention claimed is:

1. A method for handling a breakdown situation of a vehicle having a high-voltage onboard network and a low-voltage onboard network, the method comprising:
- automatically determining the breakdown of the vehicle;
- automatically determining that an energy conversion from the high-voltage onboard network into the low-voltage onboard network does not take place;
- automatically determining a state of charge of an energy storage device of the low-voltage onboard network;
- automatically determining a criticality of a vehicle situation; and
- automatically deciding, based on the state of charge and the criticality, whether measures are to be taken or proposed for protection of the vehicle and/or occupants of the vehicle and, in a case in which the measures are to be taken or proposed, deciding which of the measures to take or propose,
- wherein the vehicle can no longer, or can no longer safely, participate in road traffic due to the breakdown, but an airbag or an automatic speech connection has not yet been triggered and a traction machine is no longer operable, and
- wherein at least one of the following measures is automatically taken:
  - switching off a first group of electrical consumers,
  - switching off the first group and a further group of the electrical consumers, or
  - switching off a predefined area of exterior lights of the vehicle.

2. The method according to claim 1, wherein the high-voltage onboard network has a voltage of at least 400 V and the low-voltage onboard network has a voltage of 12 V to 48 V.

3. The method according to claim 2, wherein the high-voltage onboard network has a voltage of at least 800 V.

4. The method according to claim 1, wherein the low-voltage onboard network is powered by means of the energy storage device, which has a capacity of 10 Ah to 50 Ah.

5. The method according to claim 1, wherein the criticality of the vehicle situation is determined by a sensor for satellite-based location in conjunction with a digital roadmap.

6. The method according to claim 1, wherein the breakdown is characterized by one or more of the following:
- a fault in a travel-relevant or drive-relevant system of the vehicle,
- a tire defect,
- a failure of a fuel supply or a traction energy supply,
- a fault in a cooling system,
- a fault in a connection system, including a short circuit or a line interruption, and
- a software fault.

7. The method according to claim 1, further comprising:
- determining a reduction of the state of charge and/or an increase of the criticality and, in response thereto, deciding that the measures are to be taken for protection of the vehicle and/or the occupants.

8. The method according to claim 1, wherein the measures comprise one or more of the following:
- outputting a message to a user of the vehicle,
- switching off a first group of electrical consumers,
- switching off the first group and a further group of the electrical consumers,
- initiating or offering of placement of an emergency call, and
- switching off a predefined area of exterior lights of the vehicle.

9. A driver assistance system comprising:
- a data input; and
- an evaluation unit;
- wherein the evaluation unit is configured, based on the data input, to:
- automatically determine a breakdown of the vehicle,
- automatically determine that an energy conversion from a high-voltage onboard network into a low-voltage onboard network does not take place,
- automatically determine a state of charge of an energy storage device of the low-voltage onboard network,
- automatically determine a criticality of a vehicle situation, and
- automatically decide, based on the state of charge and the criticality, whether measures are to be taken or proposed for protection of the vehicle and/or occupants of the vehicle and, in a case in which the measures are to be taken or proposed, decide which of the measures to take or propose,
- wherein the vehicle can no longer, or can no longer safely, participate in road traffic due to the breakdown, but an airbag or an automatic speech connection has not yet been triggered and a traction machine is no longer operable, and
- wherein at least one of the following measures is automatically taken:
  - switching off a first group of electrical consumers,
  - switching off the first group and a further group of the electrical consumers, or switching off a predefined area of exterior lights of the vehicle.

10. The driver assistance system according to claim 9, wherein the high-voltage onboard network has a voltage of at least 400 V and the low-voltage onboard network has a voltage of 12 V to 48 V.

11. The driver assistance system according to claim 10, wherein the high-voltage onboard network has a voltage of at least 800 V.

12. The driver assistance system according to claim 9, wherein the low-voltage onboard network is powered by means of the energy storage device, which has a capacity of 10 Ah to 50 Ah.

13. The driver assistance system according to claim 9, wherein the criticality of the vehicle situation is determined by a sensor for satellite-based location in conjunction with a digital roadmap.

14. The driver assistance system according to claim 9, wherein the breakdown is characterized by one or more of the following:

a fault in a travel-relevant or drive-relevant system of the vehicle, a tire defect, a failure of a fuel supply or a traction energy supply, a fault in a cooling system, a fault in a connection system, including a short circuit or a line interruption, and a software fault.

15. The driver assistance system according to claim 9, wherein the evaluation unit is further configured to determine a reduction of the state of charge and/or an increase of the criticality and, in response thereto, decide that the measures are to be taken for protection of the vehicle and/or the occupants.

16. The driver assistance system according to claim 9, wherein the measures comprise one or more of the following:

outputting a message to a user of the vehicle, switching off a first group of electrical consumers, switching off the first group and a further group of the electrical consumers, initiating or offering of placement of an emergency call, and switching off a predefined area of exterior lights of the vehicle.

17. A vehicle comprising a driver assistance system according to claim 9.

* * * * *